2,935,484

ADHESIVE COMPOSITION COMPRISING STARCH, MALEIC ANHYDRIDE TRIPOLYMER AND HYDROLIZED POLYACRYLONITRILE

Lawrence F. Arnold, Avon Lake, and John F. Jones, Cuyahoga Falls, Ohio, assignors to The B. F. Goodrich Company, New York, N.Y., a corporation of New York No Drawing. Application April 3, 1957
Serial No. 650,308

4 Claims. (Cl. 260—17.4)

The present invention relates generally to starch-containing adhesives of the type used in the manufacture of corrugated paper board and paper bags. More particularly the invention relates to a one-package dry mix form of such an adhesive and to liquid adhesive compositions made therefrom.

In the paper bag and corrugated paper board industries starch-based adhesives are employed. Such an adhesive is usually made by first cooking a portion of the starch with alkali to form a cooked or gelatinized starch which is then blended with powdered, uncooked starch, the cooked starch serving as a carrier or suspending agent for the uncooked portion. This is known to the trade as a "domestic" adhesive because paper products made from it are usually used here in the United States. When such an adhesive is employed on high speed corrugating-laminating machines, it apparently has to be on the alkaline side so as to promote rapid gelatinization of an appreciable proportion of the uncooked starch. Unless it is sufficiently alkaline, the machine has to be operated at a low speed to allow time for proper gelatinization to occur and the adhesive layer to develop sufficient strength.

In these same industries there is a fast growing demand for a water-proof type of adhesive for use in the manufacture of corrugated board for use in overseas shipping and for the production of high strength, water-resistant cartons for beverage bottles, nail kegs, and the like. The "water-proof" adhesive used for this purpose is also based on starch and contains a water-soluble urea-formaldehyde resin to impart appreciable water-resistance to the bond layer. This adhesive is also made by first cooking a portion of the starch and then blending with the uncooked starch and the urea resin. However, due to the fact that the common urea resins cure best on the acid side, the adhesives are "slow" and impart only a limited degree of waterproofing.

Both the "domestic" and "water-proof" starch adhesives, and especially the latter, have a somewhat limited "pot life," they have a tendency to "clobber-out" in the machine pans and they must be prepared and used while still fresh. Most importantly, however, they require at least a two step preparation, they require cooking facilities and they are not sufficiently "fast" to use the full speed potential of modern corrugating-laminating machinery and modern bag-making machinery.

It is a principal object of this invention, therefore, to provide a stable, one-package dry mix that can be converted to an adhesive simply by stirring into water and/or aqueous alkali. It is also an important object of this invention to provide an adhesive composition containing uncooked starch, which adhesive is stable at pH levels sufficient to rapidly gelatinize the uncooked starch and which therefore can be employed at high laminating or sealing speeds. Still another object is to provide one-package dry mixes for the production of both the "domestic" and "water-proof" types of corrugating and bag sealing adhesives. It is also an object to provide adhesive compositions having an extended "pot life," which are faster, and which are simpler and more convenient to use. Other objects and advantages of the present invention will become apparent in the following description of the invention.

In accordance with the present invention it has been found that certain insoluble interpolymers of alpha-beta olefinically-unsaturated polycarboxylic acid anhydrides, and partial esters and partial amides of such interpolymers, have special utility as suspending agents in adhesives containing uncooked starch. Such suspending agents are sufficiently stable under a wide range of pH conditions, and particularly under alkaline conditions, that uncooked starch adhesives can be prepared which are unusually fast on high speed corrugating-laminating machines and on bag-sealing machines. Also such suspending agents do not require cooking or other complex preparatory treatments since the dry mix adhesives made therefrom develop high suspending and thickening power when simply stirred into water or aqueous alkali. As a result the dry, granular or powdered suspending agent or agents, and/or a dry, granular water-soluble alkali, can be preblended with dry, uncooked starch, with or without dry, thermosetting resins to produce dry, granular or powdered, one-package mixes which are easily converted to operative adhesives simply by stirring into water and/or aqueous alkali.

It has also been found that the "stringiness" of the adhesive, that is the ability of the adhesive to transfer from the supply pan-to the coating roll-to the fiber material and the ability of the adhesive to resist "striking in," can be significantly improved by the addition of a water-soluble polymer of an alpha-beta olefinically-unsaturated carboxylic acid or anhydride such as the monovalent alkali salts of hydrolyzed polyacrylonitrile, polyacrylic acid, and maleic anhydride copolymers. Thus, the insoluble resinous suspending agent provides most of the thickening, suspending and viscosity stabilization while the water-soluble resinous material seems to have an effect on the cohesiveness or "stringiness" of the adhesive. The precise rheological property or properties which determine the "stringiness" are not fully understood. Some of the insoluble resins have this property to a sufficient degree while others do not. In all cases, however, the addition of the soluble resinous material enhances this property.

Thus, the one-package mixes of this invention comprise uncooked starch, preferably finely-divided and of those types commonly employed in adhesive manufacture such as the so-called "pearl" starch, the insoluble polycarboxylic acid anhydride tripolymer suspending agent, if necessary an alkali-soluble carboxylic acid polymer, and if desired, a finely-divided, solid thermosetting resin. Still other additives such as borax to thicken the paste, preservatives, etc. may be employed. These materials are merely blended in the desired proportions to form a composite dry mix. The latter is converted to very smooth, stable adhesives simply by stirring into water or aqueous alkali. If desired a dry, granular monovalent alkali can be mixed in proper proportion with the other ingredients so as to enable the preparation of the adhesive from plain water. If not, the dry ingredients are either (1) added to an aqueous solution containing sufficient monovalent alkali to at least partially neutralize the resinous suspending agent, or agents, to supply enough alkali to gelatinize at least a portion of the starch, and/or to adjust and stabilize the pH to the desired final value, or (2) the dry mix is added to water and then alkali is added thereto.

The suspending agents of this invention are stable over a wide range of pH varying from as low as 3.0 to 3.5 to as high as 11 or 12. The unmodified interpolymers have greatest thickening power at around the neutral point or slightly above. Some of the partial ester and partial amide types have their maximum viscosity at pH levels slightly below neutrality, and some are fully effective at levels as low as 4.0 to 4.5. This pH stability and flexibility is very useful in formulating the water-proof type starch adhesives since it permits the use of thermosetting resins that cure either on the acid side or on the alkaline side of neutrality, although as indicated previously with starch adhesives a "faster" adhesive is produced on the alkaline side.

The proportion of the insoluble suspending agent may vary somewhat ranging from as little as 0.5 or 0.75 percent to as much as 2 or 3 percent by weight based on the total weight of dry mix. This is approximately equivalent to 0.1 or 0.2 percent to 1 percent on the total weight of liquid adhesive, depending on the solids content of the latter. Even greater amounts may be utilized, if desired. The exact proportion utilized for a given result will depend on the suspending agent itself (since the latter can be made so as to have quite a range of thickening, suspending action, depending on the proportion of cross-linking agent), the degree of neutralization, the degree of chemical modification by partial esterification, partial amidization, or partial esterification/amidization, the type of comonomer employed, and other factors.

The proportion of the soluble suspending agent may vary even more widely from none at all to twice or more the proportion of the insoluble suspending agent. With the better insoluble suspending agents, however, the amount may range from 0.2 to 1.0 percent or more based on the weight of dry mix. It is to be understood that this ingredient is employed if needed, and its proportion is not critical, only that proportion being required to provide satisfactory "stringiness" for the application contemplated.

In preparing the final adhesive, as described above, the dry mix is added to water or aqueous alkali and stirred. Gentle swirling type agitation is better than the more vigorous types. Unlike many suspending agents a colloid mill is not required to disperse those of this invention. The final paste-like adhesive may be made up to any solids content although usual commercial operations require a solids content of at least 10 percent, and preferably from 20 to 30 percent. In most cases the mixing and speed of hydration of the suspending agents is improved somewhat by employing warm water or warm aqueous alkali (90 to 125° F.). Mixing is continued until a smooth adhesive is obtained. The resulting adhesive can be stored in quantity and pumped to the machine without thickening up or suffering appreciable viscosity breakdown.

The present invention also includes the preparation of liquid, paste-like adhesives directly from the ingredients without first preparing a one-package dry mix. When proceeding in this manner, the ingredients can be combined in any order, although a preferred procedure is to add the starch and suspending agent, or agents, and/or the thermosetting resin to separate portions of water and then combine the resulting solutions.

As indicated above, the insoluble suspending agent is essentially a solid, finely-divided, insoluble interpolymer prepared from a monomeric material comprising as the three essential ingredients (1) an alpha-beta olefinically-unsaturated polycarboxylic acid anhydride, (2) one or more monoolefinically-unsaturated comonomers such as methyl vinyl ether and (3) a cross-linking agent containing more than two unconjugated polymerizable $$CH_2=C<$$

groupings per molecule, such as the polyalkenyl polyethers of polyhydroxy compounds. The interpolymer itself may be employed, or it may be converted to a partial ester, partial amide or partial ester/partial amide derivative, as will be described below. The partial ester and partial amide forms in some cases have increased suspending power for solids and are stable at lower pH levels than the unmodified tripolymer. Likewise, a partial amide or partial amide/ammonium salt generally will disperse in water with greater speed than the partial ester forms and the unmodified polymers. All of these insoluble polymers swell highly in water, and when partially or completely neutralized with a monovalent alkali and converted by agitation to a disperse state acquire tremendously increased thickening power, thereby forming very stable, very viscous mucilaginous compositions having the power to suspend large proportions of solids and liquids, especially organic materials such as starch and hydrocarbon oils.

Polycarboxylic acid anhydrides which have the greatest utility in the production of the basic interpolymers have the general structure

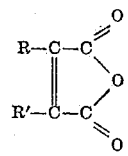

wherein R and R' are selected from the class consisting of hydrogen, halogen and the cyanogen ($-C\equiv N$) groups and alkyl, aryl, aralkyl, alkaryl and cycloaliphatic groups. Illustrative anhydrides of this structure include maleic anhydride itself, chloromaleic anhydride, dimethylmaleic anhydride, diphenylmaleic anhydride, dibenzylmaleic anhydride, di-(p-methylphenyl)maleic anhydride, dicyclohexylmaleic anhydride, chloromaleic anhydride, and others. Maleic anhydride, because of its ready availability, low cost and highly satisfactory performance is the preferred anhydride.

Since the maleic anhydride type monomers exhibit a strong tendency to form substantially 1:1 alternating interpolymers and do not copolymerize to good yields at other than equimolar proportions, it is necessary to have present an "alternator" comonomer or comonomers. Thus, in the production of the suspending agents of this invention the total proportion of "alternator" and cross-linking agent in the monomeric mixture should preferably be substantially equal, on a molar basis, to the anhydride content. Monomers that form alternating interpolymers of high molecular weight range from monoolefinic hydrocarbons such as ethylene, propylene, isobutylene, styrene and the like to ethers, ketones, esters, amides, vinyl and vinylidene halides and cyanides, such as methyl vinyl ether, ethyl vinyl ether, butyl vinyl ether, 2-ethylhexyl vinyl ether, and other alkyl vinyl ethers, methyl vinyl ketones and other alkyl vinyl ketones, vinyl esters such as vinyl acetate, vinyl butyrate, vinyl benzoate, acrylic esters such as methyl acrylate, acrylic type acids such as acrylic and methacrylic acids, vinyl chloride, vinylidene chloride, acrylamide, acrylonitrile, and the like. In many cases the alternator monomer will increase or decrease the hydrophilic properties of the interpolymers. For example, alkyl vinyl ethers, the lower aliphatic vinyl esters, and acrylamide seem to increase the sensitivity to water while hydrocarbons such as styrene and isobutylene decrease it. For the latter reason, and because they are most stable to hydrolysis, the alkyl vinyl ethers containing from about 3 to about 6 carbon atoms are preferred. One or more other "alternators" may be employed in small proportions, although when the preferred alkyl vinyl ethers are employed up to about 20 mol percent of the total monomers may comprise one or more such other monomers.

The third essential monomer ingredient, the cross-linking agent, may be any polymerizable material which contains an average of more than two polymerizable, non-conjugated $CH_2=C<$ groupings per molecule and which is reactive with the anhydride and the monoolefinic alternator comonomer or comonomers. Illustrative crosslinking monomers of this class include polyunsaturated hydrocarbons, carboxylic acids and anhydrides, esters, ethers, ketones, amides, alcohols, sulfones, and other polyunsaturated compounds of this type including, by way of example, trivinyl benzene, hexallyl trimethylene trisulfone, trimethacrylyl triazine, 1,3,5-triallyl ether of trihydroxybenzene, the vinyl, allyl, methallyl and crotyl polyethers of polyhydroxy compounds containing at least 3 hydroxyl groups and at least 4 carbon atoms such as the polyvinyl polycrotyl and polyallyl ethers of sucrose, pentaerythritol, and many others.

Since the suspending agents of this invention preferably should be resistant both to strongly acid and strongly alkaline conditions, it is preferred to utilize a cross-linking agent which produces cross-linkages which are resistant to hydrolysis. Such cross-linking agents are selected from the class consisting of polyunsaturated hydrocarbons, and the polyalkenyl polyethers of polyhydroxy compounds containing at least 4 carbon atoms and at least 3 hydroxyl groups, all of which contain an average of more than two polymerizable $CH_2=C<$ groupings per molecule and the double bonds of which are not in conjugated arrangement. Many illustrations of this preferred class are disclosed above. The polyalkenyl polyether type of crosslinking agent and its utilization in the production of hydrophilic polymers are described in greater detail in the copending application of Harold P. Brown, Serial No. 307,711, filed September 3, 1952, now U.S. Patent No. 2,798,053.

The amount of cross-linking monomer has a profound influence on the character of the suspending agent produced because the proportion and character of cross-linking seems to determine to a large extent not only the degree to which the polymer will swell but also the degree of "shortness" or "stringiness" the polymer will induce in a mucilaginous composition. Thus, the length of cross-linking molecular chain and its flexibility between polymerizable groupings and the number of such groupings will determine the rheological characteristics of the suspending agent. It might be envisioned that the polymeric suspending agents of this invention have a core composed of a few residues of the cross-linking agent to which are attached a plurality of hydrophilic anhydride copolymer units sticking out in all directions, the whole molecule somewhat resembling a pin cushion wherein each pin head represents a hydrophilic unit. Thus, the exact proportion of cross-linking agent can not be specified with precision. With the highly hydrophilic combination of maleic anhydride and methyl vinyl ether, for example, as little as 0.1 to 0.2 percent by weight of a highly functional cross-linker such as a polyallyl polyether of sucrose containing 3 to 6 allyl ether groupings per molecule is usually sufficient to impart substantial insolubility to the polymer. More may be utilized, for example, as much as 0.5 to 1.5 percent produces a yet highly hydrophilic polymer. With greater than 2.5 percent the hydrophilic properties decrease rapidly. With less high functional cross-linking agents slightly larger amounts than these may be utilized. With a more hydrophobic alternator such as styrene or isobutylene even smaller proportions should be utilized for maximum thickening and suspending action.

The basic or unmodified interpolymers can be made in any conventional manner such as polymerization in mass or in solvent or diluent mediums. By far the best results are obtained in a solvent/non-solvent process whereby the monomers are polymerized in an essentially anhydrous solvent or diluent in which the monomers, but not the polymer, is soluble. Solvent-soluble catalysts such as the various peroxides are required for rapid reaction. The product, in such a case, is a slurry of a finely-divided solid polymer which frequently is sufficiently fine for use as is. The polymer is dried and, if necessary, ground so as to be finer than about 100 mesh (U.S. Standard), and more preferably finer than about 325 mesh.

If the partial ester or partial amide derivatives are desired, it is not necessary to filter and dry the interpolymer. The raw polymerization slurry is treated with an alcohol or with an amine and heat and agitation applied until the desired degree of reaction occurs. In any case the esterification or amidization reaction is best carried out in a diluent medium. Quite severe conditions, involving the use of catalysts, higher temperatures and a large excess of reagent are required to form an appreciable proportion of the diester or diamide derivatives, especially with the higher alcohols and higher amines. The esterification reaction is facilitated by catalysts such as a small proportion of a strong amine like pyridine, or other alkaline catalyst. When it is desired to convert substantially all of the anhydride groups to the half ester, which is not necessarily desirable in all cases, a fairly large excess of up to 2 or 3 moles of alcohol for every mole of anhydride is required. In general, with the higher alcohols the reaction is carried out until only 5 to 40 percent of the anhydride linkages are opened. With the lower alcohols a slightly larger percentage are reacted, for example, from 15 to 85 percent.

The partial amide is much more easily formed, the interpolymers tending to form an amide-salt directly when about one mole of amine for every mole of anhydride is employed. When the half amide is desired, not more than a 25 percent excess of amine is desirable. Heating at 25 to 100° C. facilitates the reaction and likewise the use of an inert diluent of an organic solvent such as benzene, toluene, hexane, heptane, etc., which has a slight tendency to swell the polymer, facilitates uniform distribution of the amide linkages. Liquid aromatic hydrocarbons are the prefererd diluents for both the esterification and amidization reactions.

Any alcohol or amine can be utilized, although to prevent additional cross-linking (which may result in deswelling or loss of hydrophilic properties) by transesterification and/or diamide formation, it is preferred to utilize an alcohol or amine containing not more than one free hydroxyl or amino group. The lower monohydric alcohols and monobasic amines produce more highly hydrophilic derivatives, while the higher members produce derivatives having higher viscosity and greater emulsifying and suspending power, particularly for water-immiscible organic liquids. In general, aliphatic alcohols containing from 1 to 18 carbon atoms and primary and secondary amines, not necessarily aliphatic in nature, containing from 1 to 18 carbon atoms may be utilized. In some cases there seems to be value in employing an alkanolamine containing non-reactive amino-nitrogen, for example, diethylaminoethanol. Such partial esters exhibit the good properties and a few of the disadvantages of both the partial ester and partial amide derivatives. Illustrative alcohols include methyl, ethyl, propyl, n-butyl and sec-butyl, hexyl, octyl, alpha-ethylhexyl, decyl, lauryl, myristyl, octadecyl, cyclohexyl, and others. Illustrative amines include ammonia and methyl and dimethyl through octadecyl and dioctadecyl amines, cyclohexyl amine, aniline, monomethyl aniline, naphthylamine, o-toluidine, diphenyl amine, benzyl amine, sulfonilic acid, guanidine, pyrrole, piperidine and many others. The thickening and suspending power and emulsification action usually first increases with percent esterification and/or percent amidization, and then decreases as the full half-ester or half-amide is approached, the maximum usually occurring in the range where 5 to 85 percent of the anhydride linkages have been opened.

In some cases it is desirable to prepare a partial ester/partial amide derivative by first esterifying and then treating with an amine. For example, an 85 percent partial methyl ester can be treated in suspension with a small proportion of anhydrous ammonia to produce a derivative which hydrates and reacts more rapidly with alkali. After the esterification and/or amidization is complete the polymer is separated from the diluent, washed and dried.

Likewise, conversion to the salt form, in which the interpolymers and their derivatives acquire greatly enhanced hydrophilic properties, involves the use of a monovalent alkali such as any monovalent metal or ammonium hydroxide or ionizable salt. Illustrative neutralizing agents of this type include any of the alkali metal hydroxides, ammonium hydroxide, sodium carbonate, sodium bicarbonate, sodium phosphate, sodium acetate, sodium chloride, potassium carbonate, anhydrous or aqueous ammonia, and the like. It is preferred that no appreciable quantity of polyvalent metal ions be introduced due to their powerful deswelling action. Sequestering or chelating agents sometimes can be employed to prevent loss of thickening effect. Maximum viscosity and maximum suspending and emulsifying action usually occur at a degree of neutralization somewhat short of completion, although this effect can be balanced against percent esterification and/or percent amidization to secure the desired pH stability. It is most desirable to neutralize to somewhere in the range of 10 to 90 percent. As pointed out above this is most conveniently done with a dry mix by adding the latter to aqueous alkali. Equally satisfactory is the dry blending of a dry neutralizing agent with the dry adhesive mix, which mixture is then added to water for in situ neutralization.

The water-soluble suspending agent may be any water-soluble carboxylic polymer, which is soluble in its salt-form, having a sufficiently high molecular weight to have an appreciable thickening action. Polyacrylic acid and copolymers high in acrylic acid content form quite viscous solutions in aqueous alkaline media. Similarly, partially or completely hydrolyzed polyacrylonitrile forms a water-soluble material containing carboxyl groups and/or acrylamide groups and possibly unreacted nitrile groups, which contributes excellent "stringiness" to an adhesive. Likewise, copolymers of acrylic acid and acrylamide are excellent for this purpose. Copolymers of maleic anhydride and vinyl acetate have fair properties in this application. Any polymer or copolymer containing at least 50 mole percent of an alpha-beta olefinically-unsaturated carboxylic acid or anhydride can be employed. The soluble suspending agent can be made in aqueous media, in which case the solution obtained can be added as such to the final adhesive composition or it can be dried for addition to a dry mix. These soluble carboxylic acid polymers can also be conveniently made in solvent/non-solvent media, as described above.

When preparing a dry mix for a water-proof type of adhesive any water-soluble or water-dispersible, or alkali-soluble thermosetting resin can be employed. In some cases the dry, resin-forming ingredients can be added to the dry mix if reaction will ensure after addition of the mix to water or aqueous alkali (in the final adhesive) to produce, in situ, the desired thermosetting resin. Mixtures of dry resorcinol and dry paraformaldehyde react in aqueous alkali to produce an excellent water-proofing resin. Others such as urea/aldehyde, and especially urea/formaldehyde resins, and phenol/formaldehyde resins can very conveniently be produced in partially-reacted, water-soluble forms which are easily dried to form free-flowing powders. Optionally, in preparing an adhesive without first preparing a dry mix, any of the water-solutions of these thermosetting resins can be added directly to the mixture at any stage of the preparation. The use of the dry powders is most convenient, eliminates difficulties which may be encountered in adding the solution form of the resins (coagulation, etc.), and produces a most uniform product.

The invention will now be described in greater detail with reference to several specific examples which are intended as illustrative only.

*Example 1*

In this example, a cross-linked maleic anhydride/methyl vinyl ether polymer cross-linked with about 1 percent by weight on the total monomers of a polyallyl ether of sucrose containing an average of 5.6 to 5.8 allyl ether groups per molecule is prepared by polymerization in anhydrous benzene at 50 to 100° C. using O,O'-dichlorobenzoyl peroxide catalyst. The polymerization proceeds rapidly to form a somewhat thick slurry of very fine resin particles dispersed in benzene. After polymerization is complete, sufficient methanol or diethylaminoethanol is added to produce a partial methyl ester wherein 85 percent of the anhydride linkages have been opened or a partial diethylaminoethanol ester wherein 30 percent of the anhydride linkages have been opened. A small catalytic amount of pyridine is added and gentle heating (under reflux in the case of methanol) is applied. When the desired reaction has occurred, the product slurry is then filtered in a plate-and-frame filter press, the filter cake washed with fresh benzene and then dried in a solvent dryer. At this point particles larger than 100 mesh are screened out. The resulting solid product is referred to hereinafter as "Suspending Agent No. 1."

Another resin is prepared by polymerizing polyacrylonitrile in aqueous emulsion to produce a fine particle size latex of a moderately high molecular weight polyacrylonitrile. A theoretical quantity of sodium or potassium hydroxide is then added and heat is applied to hold the charge at 80° C. while gently agitating the mix. Heating is continued for a time after the latex-like milkiness has disappeared (solid particles have reacted and gone into solution). The product is moderately viscous, clear solution containing about 20 percent total solids by weight. Analysis reveals that the product is essentially sodium or potassium polyacrylate plus some acrylamide groups indicating that hydrolysis is not complete. The resulting solution can be used as such for the preparation of liquid starch adhesives. In this example, however, it is dried on a drum drier to produce a readily soluble dry flake ("Suspending Agent No. 2") useful in the preparation of dry mix starch adhesives. If the amount of caustic were reduced to as little as 50 percent of theory even more viscous solutions are produced, some of the less highly hydrolyzed products being almost paste-like in consistency.

Hand mixing is used to dry blend the following ingredients:

| Material: | Parts/wt., grams |
|---|---|
| "Staythick" starch [1] | 292 |
| Urea/formaldehyde resin [2] | 51 |
| Suspending Agent No. 1 | 3 |
| Suspending Agent No. 2 | 2 |

[1] Supplied by A. E. Staley Co. and identified by the supplier as an uncooked cornstarch "neutralized" or treated with methylolurea so as to maintain its viscosity in water.
[2] "Urac 110"—American Cyanamid Co.

After a uniform mixture is obtained the powder is added gradually to 950 grams of tap water containing caustic soda and maintained at about 100° F. while gently agitating the latter. After 20 minutes of mixing the viscosity (by the Bauer funnel method) is 29.5 seconds at 83° F. The adhesive is mixed for 15 minutes additional to determine its tendency to break down under shear. The final viscosity is 30 seconds, the pH is 6.2 and the paste exhibits satisfactory "stringiness." A hand made sample of single-faced corrugated board is prepared by spreading the paste on the liner and applying the latter to the corrugated core. Initial adhesion is good. After aging 2 hours in a 100° C. oven the board is soaked in water for 1 hour. At the end of this time there is good water-proofness in the bond since the pasted liner pulls fibers out of the corrugating medium when the layers are pulled apart.

Example II

A similar mix is made using the resins of the preceding example. Staley's "#2 Pearl Starch" identified by the supplier as an uncooked, unmodified cornstarch is used because it exhibits a lower pH in solution. The proportions and materials are otherwise the same. After 15 minutes of mixing the viscosity is 26 sec. at 83° F., after 30 minutes it is 27 sec. at 79° F., and after 45 minutes it is 27 sec. at 76° F. The pH of the final adhesive is 5.5 and the paste exhibits satisfactory "stringiness." This "paste" also gives good water-proofing and exhibits a very good "pot life."

The paste-like adhesives of Examples I and II are compared for viscosity and "stringiness" to a control paste of the "Domestic" type prepared by first mixing 35 grams of finely powdered corrugating starch ("Staley's Corrugating Starch No. 1" identified by the supplier as an uncooked cornstarch) with 90 cc. of water at 90° F. A kitchen style mixer is used. After the starch has "gone in" 50 cc. of a 10 percent NaOH solution are gradually added to cause a "pasting" of the starch (gelatinization). An additional 140 cc. of water are added and the mix is mixed for some time until "smooth." A second starch mix is then prepared in a similar fashion by adding 140 grams of starch ("Staley's Pearl No. 2") to a solution containing 5 grams of "Borax" in 440 cc. of water. When the starch is "in" the first "pasted" mix is added to the "Borax" mixture using high speed mixing or beating. After the two have been blended mixing is continued for 10 minutes or until a smooth blend is obtained. It was found that the adhesives of Examples I and II compared very favorably with the "Domestic" control as to viscosity and stringiness.

Example III

A mix similar to that of Example I is made except that the hydrolyzed polyacrylonitrile is omitted. The uncooked starch is well suspended, the mix is smooth and it produces an excellent, water-proof bond. However, when used to prepare a corrugated board it was found deficient in stringiness.

Example IV

Another paste is made up in larger quantities in order to make a plant run on a large commercial scale corrugating-laminating machine. The following materials are placed in a "Francis" mixer:

| Material: | Parts/wt., lbs. |
|---|---|
| "Pearl" starch [1] | 600 |
| Suspending Agent No. 1—Example 1 | 6 |
| Suspending Agent No. 2—Example 1 | 4 |

[1] An unmodified cornstarch.

When a uniform mixture is obtained (15 minutes) the material is dropped from the mixer directly into 200 gallons of water (at 115° F.). Mild agitation for 15 minutes produces a smooth, "stringy" adhesive having a viscosity of 27 seconds at 107° F. At this point 26 gallons of water are added to reduce the viscosity to 24 seconds at 105° F. The pH is on the acid side. The paste is then pumped to a single-facer, double-backer type machine operated at 112 linear ft./min. and good adhesion obtained. The paste is then made alkaline (pH 7 to 12) by addition of concentrated caustic and the run continued at a speed of 137 linear ft./min. Samples of the board soaked in water for 24 hours pulled fiber when the double backer side is pulled away from the corrugated layer.

A dry mix similar to that described above is bagged and stored under ordinary warehouse conditions. After storage for 6 to 12 months or more the dry mix produces excellent corrugating adhesives.

Example V

A paste is made up as above except that the 200 gallons of water to which the dry mix is added contains 12 lbs. of caustic soda. The corrugating-laminating machine is operated at 200 linear ft./min. Good adhesion is obtained and the bond layer shows fair water-proofing. Good adhesion also is obtained at speeds of 250 and 300 ft./min.

Example VI

A dry mix is made as follows:

| Material: | Parts/wt. |
|---|---|
| Pearl starch | 600 |
| Paraformaldehyde | 17 |
| Resorcinol | 30 |
| Suspending Agent No. 1—Example No. 1 | 6 |
| Suspending Agent No. 2—Example No. 1 | 4 |

The above dry mix is added to 220 gallons of water at 105° F. After the dry mix is "in," a solution containing 10 lbs. of NaOH in 6 gallons of water are added while continuing to gently agitate the mix. The final viscosity of the mix is 20 sec. and the pH is 11.

When run on a double-backer/single-facer machine at 187 ft./min. and 250 ft./min. adhesion is excellent and good water-proofing is obtained on the double-backer layer and fair on the single facer layer.

Example VII

In this example an unmodified, insoluble tripolymer of maleic anhydride/methyl vinyl ether cross-linked with 0.5 percent of a polyallyl polyether of pentaerythritol containing an average of 2.5 to 3.5 allyl ether groups per molecule is employed. A dry mixture is prepared by blending the following ingredients:

| Material: | Parts/wt. |
|---|---|
| Uncooked cornstarch | 585 |
| "Urac 110" | 100 |
| Suspending agent (above) | 5 |

In this mix no soluble hydrolyzed polyacrylonitrile is employed. After dry mixing for 15 minutes the dry mix is added to water containing about 0.5 percent caustic. Mixing for 15 to 30 minutes produces a very smooth paste having a pH of 10 to 12 and excellent stringiness. The viscosity of the paste is comparable to those of the preceding examples even though a reduced amount of suspending agent is used. When employed as a corrugating adhesive, excellent adhesion and good water-proofing are obtained at speeds double or more than usually used with similar adhesives operated on the acid side and prepared as follows:

*Carrier portion.*—Starch (uncooked cornstarch) 117 grams, 1.5 grams of NaOH and 830 grams of water are mixed and heated (cooked) at 190° F. for 5 minutes. This produces a gelatinized or cooked starch carrier.

*Suspended portion.*—A mixture of 585 grams of #2 starch, 52 grams of alum, 100 grams of "Urac 110" and 1150 grams of water are mixed and the "carrier" portion added thereto and mixing continued for 20–30 minutes. The product is a paste having a viscosity of 25 seconds by the Bauer funnel method (about 2500 centipoises) and a pH of 4.0–4.2.

Example VIII

In this example, a "domestic" adhesive is prepared. First, a dry mix of 600 lbs. of dry starch, 6 lbs. of Suspending Agent No. 1 (Example I) and 4 lbs. of Suspending Agent No. 2 (Example I) is prepared. The dry mix is added to 200 gallons of water containing about 8 to 10 lbs. of NaOH. In 15–20 minutes of mixing a smooth, stable paste is obtained having excellent "stringiness." When utilized on a corrugating-laminating machine, excellent adhesion is obtained. In addition the adhesive of this example has a better "pot life" than a comparable cooked starch adhesive.

Example IX

In a similar fashion the suspending agent of Example VII is employed as the sole suspending agent in the production of a similar domestic paste. The proportion and procedure is similar to that of Example VIII. The adhesive has excellent stability, it is smooth, has excellent stringiness, and develops excellent adhesion at increased speeds on corrugating-laminating machines.

We claim:

1. A single-package dry mix composition adapted to be converted to an adhesive upon being stirred into aqueous alkali, which mix comprises dry, uncooked starch, from about 0.5 to 3%/wt. on the total of said dry mix composition of an insoluble suspending agent which is readily dispersible in aqueous alkali and selected from the class consisting of an insoluble maleic anhydride tripolymer, its partial ester derivatives in which from 5 to 85% of its anhydride linkages have been opened by reaction with monohydric alcohol, and its partial amide derivatives in which from 5 to 85% of its anhydride linkages have been opened by reaction with an amine containing a single amino group per molecule, said tripolymer being formed by the polymerization of a monomeric material comprising (1) maleic anhydride, (2) an alkyl vinyl ether containing from 3 to 6 carbon atoms and (3) a cross-linking monomer having more than two non-conjugated $CH_2=C<$ groups per molecule and selected from the class consisting of trivinyl benzene, hexaallyl trimethylene trisulfone, trimethacrylyl triazine, 1,3,5-triallyl ether of trihydroxybenzene, and the vinyl, allyl, methallyl and crotyl polyethers of aliphatic polyhydroxy compounds which contain at least 3 hydroxy groups and at least 4 carbon atoms, the sum of the proportions of said monomers (2) and (3) being about equimolar with that of the said maleic anhydride and said monomer (3) constituting from about 0.1 to 2.5%/wt. of said monomeric mixture, and 0.2 to 1%/wt. on the total weight of said dry mix composition of a solid, granular, alkali-soluble hydrolyzed polyacrylonitrile.

2. A composition as defined in claim 1 wherein the said insoluble suspending agent is a partial methyl ester of a tripolymer of (1) maleic anhydride (2) methyl vinyl ether and (3) a polyallyl ether of sucrose containing 5.6 to 5.8 allyl ether groups per molecule, in which partial ester from about 15 to 85% of the anhydride linkages have been opened by reaction with methanol.

3. An adhesive composition comprising water, 10 to 30% by weight of solids, based on the total weight of said adhesive composition, and comprising uncooked starch and from 0.1 to 1%/wt. of an insoluble suspending agent dispersed in said composition, based on the total weight of said composition, and selected from the class consisting of an insoluble maleic anhydride tripolymer, its partial ester derivatives in which from 5 to 85% of its anhydride linkages have been opened by reaction with a monohydric alcohol, and its partial amide derivatives in which from 5 to 85% of its anhydride linkages have been opened by reaction with an amine containing a single amino group per molecule, said tripolymer being formed by the polymerization of a monomeric material comprising (1) maleic anhydride, (2) an alkyl vinyl ether containing from 3 to 6 carbon atoms and (3) a cross-linking monomer having more than two non-conjugated $CH_2=C<$ groups per molecule and selected from the class consisting of trivinyl benzene, hexaallyl trimethylene trisulfone, trimethacrylyl triazine, 1,3,5-triallyl ether of trihydroxybenzene, and the vinyl, allyl, methallyl and crotyl polyethers of aliphatic polyhydroxy compounds which contain at least 3 hydroxy groups and at least 4 carbon atoms, the sum of the proportions of said monomers (2) and (3) being about equimolar with that of the said maleic anhydride and said monomer (3) constituting from about 0.1 to 2.5%/wt. of said monomeric mixture, and 0.2 to 1%/wt., based on the total weight of said adhesive composition, of a dissolved hydrolyzed polyacrylonitrile and a dissolved monovalent alkali sufficient (a) to neutralize said insoluble suspending agent to the extent of 10 to 90% and (b) to gelatinize at least a portion of said uncooked starch.

4. An adhesive composition as defined in claim 3 wherein the said insoluble suspending agent is a partial methyl ester of a tripolymer of (1) maleic anhydride (2) methyl vinyl ether and (3) a polyallyl ether of sucrose containing 5.6 to 5.8 allyl ether groups per molecule in which partial ester from about 15 to 85% of the anhydride linkages have been opened by reaction with methanol.

No references cited.